United States Patent
Li et al.

(10) Patent No.: US 12,212,175 B2
(45) Date of Patent: Jan. 28, 2025

(54) CHARGING CONTROL METHOD AND APPARATUS, ELECTRONIC DEVICE AND STORAGE MEDIUM

(71) Applicant: Beijing Xiaomi Mobile Software Co., Ltd., Beijing (CN)

(72) Inventors: Bingyang Li, Beijing (CN); Changyu Sun, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 465 days.

(21) Appl. No.: 17/646,647

(22) Filed: Dec. 30, 2021

(65) Prior Publication Data

US 2022/0407330 A1     Dec. 22, 2022

(30) Foreign Application Priority Data

Jun. 21, 2021   (CN) .......................... 202110686928.X

(51) Int. Cl.
*H02J 7/00* (2006.01)

(52) U.S. Cl.
CPC ...... *H02J 7/0071* (2020.01); *H02J 7/007182* (2020.01); *H02J 7/007188* (2020.01); *H02J 2310/22* (2020.01)

(58) Field of Classification Search
None
See application file for complete search history.

(56) References Cited

U.S. PATENT DOCUMENTS

| | | | | |
|---|---|---|---|---|
| 5,886,954 A | * | 3/1999 | Asami ..................... | G04C 3/001 368/227 |
| 2009/0266631 A1 | * | 10/2009 | Kikuchi ................ | B60L 3/0046 180/65.265 |
| 2009/0273319 A1 | * | 11/2009 | Young ................... | H02J 7/0029 320/137 |
| 2009/0278508 A1 | * | 11/2009 | Sani ................... | H02J 7/007182 320/162 |
| 2012/0146590 A1 | * | 6/2012 | Chiu ..................... | H02J 7/0071 320/155 |
| 2015/0123621 A1 | * | 5/2015 | Kim ................... | H02J 7/007182 320/137 |
| 2019/0267814 A1 | * | 8/2019 | Yin ................... | H02J 7/007182 |

FOREIGN PATENT DOCUMENTS

| | | |
|---|---|---|
| CN | 107425579 A | 12/2017 |
| CN | 107863575 A | 3/2018 |
| WO | 2017133197 A1 | 8/2017 |

* cited by examiner

*Primary Examiner* — Arun C Williams
(74) *Attorney, Agent, or Firm* — McCoy Russell LLP

(57) ABSTRACT

A charging control method includes: obtaining a battery electric quantity of the terminal device and current state information of the terminal device; determining a target charging strategy according to the battery electric quantity and/or the current state information; and controlling the terminal device to be charged according to the target charging strategy.

18 Claims, 2 Drawing Sheets

CHARGING CONTROL METHOD AND APPARATUS, ELECTRONIC DEVICE AND STORAGE MEDIUM

CROSS REFERENCE TO RELATED APPLICATION

The present application claims priority to Chinese Patent Application No. 202110686928.X, filed on Jun. 21, 2021. The entire contents of the above-listed application are hereby incorporated by reference for all purposes.

BACKGROUND

With the popularization of terminal devices, the charging power of the terminal devices is increasing, and the charging speed is getting higher and higher.

SUMMARY

The present disclosure relates to the technical field of charging, in particular to a charging control method and apparatus, an electronic device, and a storage medium.

According to a first aspect of examples of the disclosure, a charging control method is provided, is applied to a terminal device, and includes:

obtaining a battery electric quantity of the terminal device and current state information of the terminal device;
  determining a target charging strategy according to the battery electric quantity and/or the current state information; and
  controlling the terminal device to be charged according to the target charging strategy.

According to a second aspect of examples of the disclosure, an electronic device is provided, and includes:

a processor and a memory configured to store executable instructions that can run on the processor.

When the processor is configured to run the executable instructions, the processor implements the charging control method as described in the first aspect by operating the executable instructions.

According to a third aspect of examples of the disclosure, a non-transitory computer-readable storage medium is provided, the computer-readable storage medium stores computer-executable instructions, and when the computer-executable instructions are executed by a processor, the charging control method according to the above first aspect are implemented.

It should be understood that the above general descriptions and the following detailed descriptions are exemplary and explanatory only, and are not intended to limit the disclosure.

BRIEF DESCRIPTION OF THE FIGURES

The accompanying drawings, which are incorporated in and constitute a part of this specification, illustrate examples consistent with the disclosure and, together with the specification, serve to explain the principles of the disclosure.

DETAILED DESCRIPTION

Examples will be described in detail herein, instances of which are illustrated in the accompanying drawings. When the following description refers to the accompanying drawings, the same numbers in different drawings represent the same or similar elements unless otherwise indicated. The examples described in the following examples do not represent all examples consistent with the disclosure. On the contrary, they are merely examples of devices and methods consistent with some aspects of the disclosure.

With the popularization of terminal devices, the charging power of the terminal devices is increasing, and the charging speed is getting higher and higher. However, the increase in charging speed also causes a lot of heat to be generated in the charging process, which affects the charging effect. In addition, different users have different heat sensitivities and different charging habits during the actual use of the terminal devices. If charging is only based on a fixed charging strategy, the charging effect will be poor and the user experience will be reduced.

Figure 1:
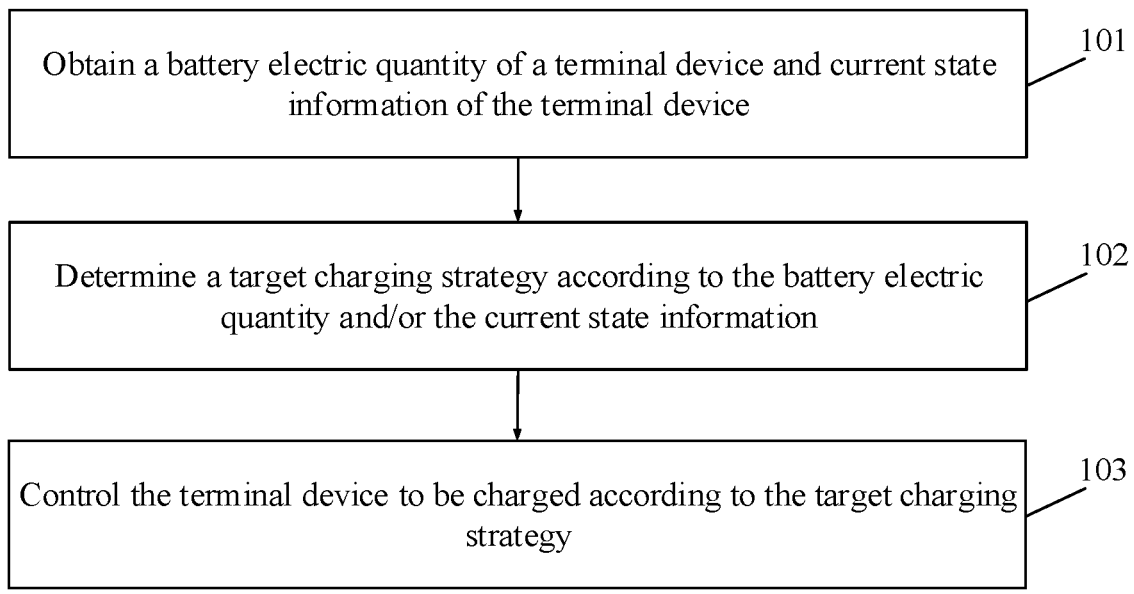
FIG. 1 is a first flow chart showing a charging control method according to an example.

An example of the disclosure provides a charging control method. FIG. 1 is a first flow chart showing a charging control method according to an example. As shown in FIG. 1, the charging control method includes the following steps:

in step 101, a battery electric quantity of a terminal device and current state information of the terminal device are obtained;
  in step 102, a target charging strategy is determined according to the battery electric quantity and/or the current state information; and
  in step 103, the terminal device is controlled to be charged according to the target charging strategy.

It should be noted that the charging control method may be applied to any terminal device. The terminal device may include a mobile terminal and a fixed terminal. The mobile terminal may include a smart phone, a tablet computer, a wearable electronic device, and so on. The fixed terminal may include: a personal computer, a server, and so on.

The battery electric quantity of the terminal device may be a current battery remaining electric quantity of the terminal device. For example, a state of charge (SOC) of a battery of the terminal device may be obtained. Since the state of charge can reflect a remaining capacity of the battery, a numerical value is defined as a ratio of the remaining capacity to a battery capacity. After the state of charge is obtained, the battery electric quantity of the terminal device may be obtained. In other examples, the battery electric quantity of the terminal device may also be obtained in other ways, which is not specifically limited here.

The current state information of the terminal device may include: an on-off state of a display screen of the terminal device, brightness information of the display screen of the terminal device, an occupancy rate of a processor of the terminal device, and other information, and the current state information may characterize a power consumption state of the terminal device.

In the examples of the disclosure, in the case where a dynamic charging function of the terminal device is turned on, the target charging strategy may be determined according to the battery electric quantity and/or the current state information. In some examples, the charging strategy may be stored in a preset charging strategy set. The charging strategy set may include at least one charging strategy, for example, may include N charging strategies, and N is a positive integer greater than or equal to 1.

In some examples, a charging speed corresponding to each charging strategy will also be different. In the implementation process, different charging strategies may be set according to needs. For example, different charging strategies may be set according to historical charging data of the terminal device. In the disclosure, by presetting the charging strategies and setting the charging strategies in the charging strategy set, a user can conveniently select the corresponding charging strategy to charge the terminal device by himself.

In some examples, different operation controls may be set for different charging strategies on a setting interface of the terminal device. In the implementation process, the user may select the corresponding charging strategy through each operation control and trigger the selected charging strategy. For example, a first operation control may correspond to a first charging strategy; a second operation control may correspond to a second charging strategy; and a third operation control may correspond to a third charging strategy. In the implementation process, a corresponding touch operation may be input to each operation control to realize the selection of different charging strategies. For example, if a long-press operation input for the first operation control is detected out, it is determined that the user selects the first charging strategy for charging. For another example, if a long-press operation input for the second operation control is detected out, it is determined that the user selects the second charging strategy for charging and so on. Of course, other touch operations may also be input through the operation controls. For example, the selection and triggering of each charging strategy can be realized based on a sliding operation, which is not specifically limited here. Since the battery electric quantity and the current state information are visual information, in the implementation process, the user may view the battery electric quantity and the current state information, and manually trigger the operation controls to determine the target charging strategy, improving the user's experience for using the terminal device.

In other examples, the dynamic charging function may also be set for the terminal device. In the implementation process, the dynamic charging function may be turned on and off based on the operation input by the user. For example, the dynamic charging function may be turned on and off by inputting gesture operations. For another example, a control corresponding to the dynamic charging function may be added to the setting interface of the terminal device, so that the user can input the trigger operation through the control, and turn on or turn off the dynamic charging function of the terminal device based on the trigger operation.

In the examples of the disclosure, in the case where the dynamic charging function of the terminal device is turned on, the target charging strategy may be determined according to the battery electric quantity and/or the current state information, and the terminal device may be controlled to be charged according to the target charging strategy. In this way, the user can choose whether to turn on the dynamic charging function of the terminal device according to his own habits. In the charging process, the user's charging habits are fully considered, so that the user's experience for using the terminal device is improved, and in the case where the dynamic charging function is turned on, the terminal device may automatically determine the target charging strategy in the charging process and dynamically adjust the target charging strategy in real time, so that the intelligence of the charging control method is improved and the charging efficiency of the terminal device is improved.

In some examples, the current state information includes: the on-off state of the display screen of the terminal device and the current power consumption of the terminal device; and the determining the target charging strategy according to the battery electric quantity and/or the current state information, includes:

the target charging strategy is determined according to at least one of an electric quantity interval in which the battery electric quantity is located, the on-off state of the display screen, or the current power consumption.

The electric quantity interval at least includes: a first electric quantity interval, a second electric quantity interval, and a third electric quantity interval, an electric quantity value covered by the first electric quantity interval is less than an electric quantity value covered by the second electric quantity interval, and the electric quantity value covered by the second electric quantity interval is less than an electric quantity value covered by the third electric quantity interval.

The current state information may include the on-off state of the display screen of the terminal device and the current power consumption of the terminal device. In the implementation process, the target charging strategy may be determined according to at least one of the electric quantity interval in which the battery electric quantity is located, the on-off state of the display screen, or the current power consumption.

In a possible example, for example, an adapter is inserted into the terminal device, the terminal device establishes connection with the adapter, and charging is started. At this time, the terminal device may detect the current state information, such as the on-off state of the display screen and the current power consumption, and may also detect the current battery electric quantity and judge the electric quantity interval in which the battery electric quantity is located, and then may determine the corresponding target charging strategy based on the detected information, charging is performed based on the target charging strategy, and as the charging progresses, the current state information and the battery electric quantity will change. In the examples of the disclosure, in the charging process, the target charging strategy may also be continuously updated, that is, in the charging process, the current state information and the current battery electric quantity may also be continuously detected, and the target charging strategy is continuously updated, for example, may be updated at a certain period interval, which is not specifically limited, so that the target charging strategy can be dynamically adjusted in the charging process, and the charging efficiency is improved.

In the examples of the disclosure, three electric quantity intervals may be set, namely, the first electric quantity interval, the second electric quantity interval, and the third electric quantity interval. In other optional examples, other quantities of electric quantity intervals may also be set, for example, two electric quantity intervals, or four electric quantity intervals may be set, that is, the quantity of electric quantity intervals in the disclosure may be set as required.

Taking the setting of three electric quantity intervals as an example, the first electric quantity interval may be: an interval with a remaining electric quantity of greater than or equal to 0% and less than or equal to 25%; the second electric quantity interval may be: an interval with a remaining electric quantity of greater than 25% and less than or equal to 75%; and the third electric quantity interval may be: an interval with a remaining electric quantity of greater than 75% and less than or equal to 100%. An upper limit value of the first electric quantity interval and an upper limit value of the second electric quantity interval are two dynamic demarcation values. In the implementation process, the two demarcation values may be dynamically adjusted according to the user's behavior habits when charging.

In the examples of the disclosure, by setting a plurality of electric quantity intervals, making a boundary value of each electric quantity interval adjustable, and in the process of charging control, taking the overall power consumption of the terminal device into account, more application scenarios may be covered, and the charging control method is more accurate and closer to user's usage habits.

In some examples, the method further includes:
the boundary value of each electric quantity interval is adjusted according to the historical charging data.

The boundary value of each electric quantity interval includes: an upper limit value and a lower limit value of the electric quantity interval.

Figure 2:
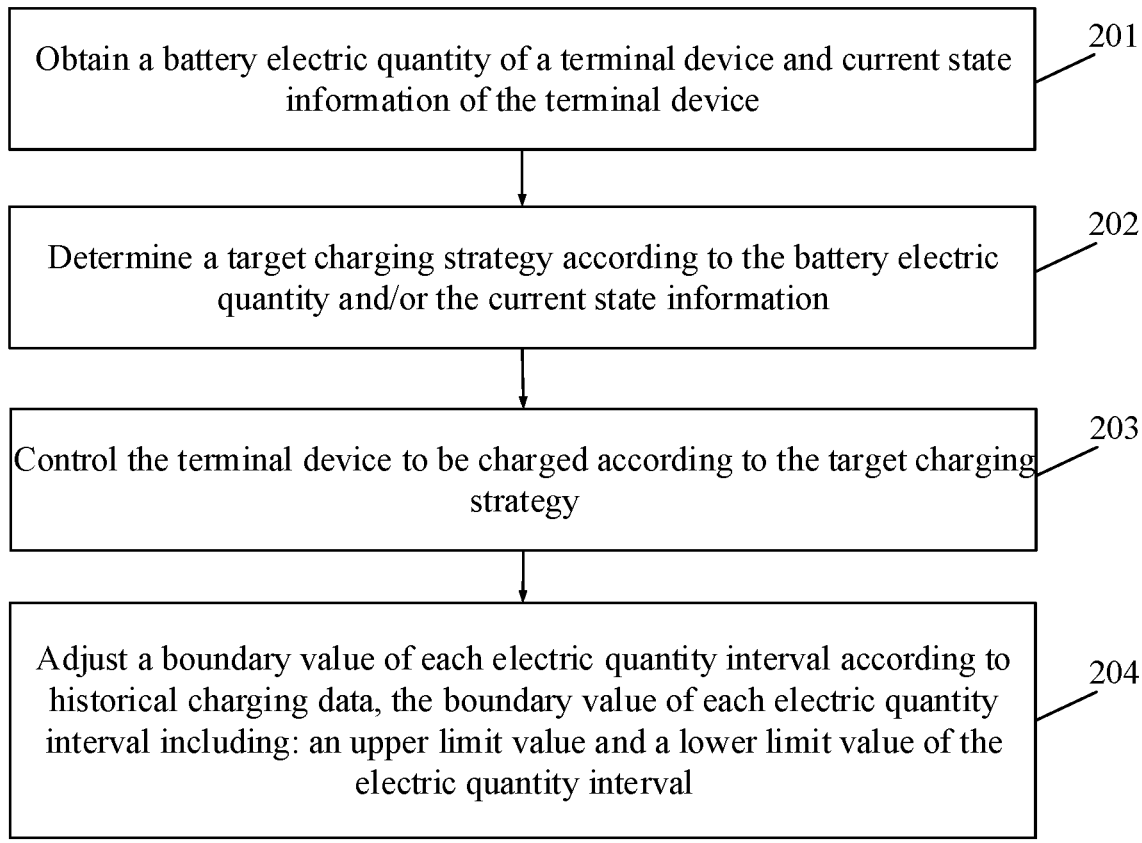
FIG. 2 is a second flow chart showing a charging control method according to an example.

FIG. 2 is a second flow chart showing a charging control method according to an example. As shown in FIG. 2, the charging control method includes the following steps:
in step 201, a battery electric quantity of a terminal device and current state information of the terminal device are obtained;
in step 202, a target charging strategy is determined according to the battery electric quantity and/or the current state information;
in step 203, the terminal device is controlled to be charged according to the target charging strategy; and
in step 204, a boundary value of each electric quantity interval is adjusted according to historical charging data; and the boundary value of each electric quantity interval includes: an upper limit value and a lower limit value of the electric quantity interval.

In the examples of the disclosure, every time after charging, charging data (historical charging data) for charging the terminal device may be recorded, and the boundary value of each electric quantity interval is adjusted according to the recorded charging data, that is, the upper limit value and/or the lower limit value of each electric quantity interval may be adjusted.

For example, the historical charging data may be sorted in descending order, and the boundary value of each electric quantity interval is adjusted according to historical charging data (median value) located in the middle position. For another example, all the historical charging data may be averaged, and the boundary value of each electric quantity interval is adjusted according to a calculated average value (mean value). For another example, historical charging data with the most occurrences may be determined, and the boundary value of each electric quantity interval is adjusted according to the historical charging data with the most occurrences (mode value).

In some examples, the historical charging data includes: a historical initial charging electric quantity and a historical ending charging electric quantity of the terminal device; and
the adjusting the boundary value of each electric quantity interval according to the historical charging data, includes:
in response to the historical initial charging electric quantity within a first set duration is greater than an upper limit value of a first electric quantity interval, the upper limit value of the first electric quantity interval is increased; and
in response to the historical ending charging electric quantity within a second set duration is greater than a lower limit value of a third electric quantity interval, the lower limit value of the third electric quantity interval is increased.

The historical charging data includes the historical initial charging electric quantity and the historical ending charging electric quantity, and may also include a historical charging duration. In the examples of the disclosure, in the process of charging the terminal device, the terminal device may record the initial charging electric quantity, the charging duration, and the ending charging electric quantity of each charging, as the historical charging data.

For example, the electric quantity interval in which the user's initial charging electric quantity is located may be determined, and if the initial charging electric quantity is greater than the upper limit value of the first electric quantity interval within the first set duration, the upper limit value of the first electric quantity interval may be increased. By taking that the first electric quantity interval is an interval greater than or equal to 0% and less than or equal to 25% as an example, the upper limit value of 25% may be adjusted to 35%. The above is only an example, and the upper limit value of the first electric quantity interval may be specifically adjusted according to a numerical value of the initial charging electric quantity.

For another example, the electric quantity interval in which the ending charging electric quantity when charging is finished is located may be determined, and if the ending charging electric quantity is greater than the lower limit value of the third electric quantity interval within the second set duration, the lower limit value of the third electric quantity interval may be increased. By taking that the third electric quantity interval is an interval greater than 75% and less than or equal to 100% as an example, the lower limit value of 75% may be adjusted to 85%. The above is only an example, and the lower limit value of the third electric quantity interval may be specifically adjusted according to a numerical value of the ending charging electric quantity.

In the examples of the disclosure, the boundary value of each electric quantity interval may be adjusted according to the historical charging data. Since the historical charging data can characterize the user's own behavior habits, a charging solution is automatically modified based on the user's own behavior habits, the electric quantity interval is adjusted, a user's own model may be dynamically constructed without a large amount of data, and meanwhile, the historical charging data is only locally, there is no risk of leakage of user data, and the security of data interaction can be improved.

In some examples, the determining the target charging strategy according to at least one of the electric quantity interval in which the battery electric quantity is located, an on-off state of a display screen, or current power consumption, includes:
a first charging strategy is determined as the target charging strategy in a case where the battery electric quantity is in the first electric quantity interval.

Charging power of the terminal device to be charged according to the first charging strategy is greater than preset charging power.

The charging power is positively correlated with a charging speed, that is, the greater the charging power for charging the terminal device, the higher the charging speed of the terminal device. In the examples of the disclosure, since the charging power is greater than the preset charging power when the terminal device is charged according to the first charging strategy, the charging speed of the terminal device may be made higher. The preset charging power may be set according to needs, which is not specifically limited here. The charging power of the terminal device to be charged according to the first charging strategy is greater than charging power of the terminal device to be charged according to other charging strategies.

In the examples of the disclosure, when the battery electric quantity is in the first electric quantity interval, a remaining battery electric quantity of the terminal device is relatively low. At this time, the first charging strategy (extremely fast charging mode) may be directly determined as the target charging strategy. Since the charging power of the terminal device to be charged according to the first charging strategy is greater than the preset charging power, the charging speed for charging according to the first charging strategy is higher, that is, in the first electric quantity interval, regardless of a charging scenario, the extremely fast charging strategy is adopted, that is, under the premise of the safety of the terminal device, the charging temperature is released, the charging power is maintained as much as possible, the charging speed is increased, and the battery electric quantity can be quickly restored, reducing the possibility of shutting down of the terminal device due to a low electric quantity.

In some examples, the determining the target charging strategy according to at least one of the electric quantity interval in which the battery electric quantity is located, the on-off state of the display screen, or the current power consumption, includes:

the target charging strategy is determined according to the on-off state of the display screen and/or the current power consumption in a case where the battery electric quantity is in a second electric quantity interval or the third electric quantity interval.

In the examples of the disclosure, in the case where the battery electric quantity of the terminal device is in the second electric quantity interval or the third electric quantity interval, it means that the current remaining electric quantity of the terminal device is relatively sufficient. At this time, in order to reduce the condition that the rapid charging causes too high temperature of the terminal device, a use scenario of the terminal device may be judged according to the on-off state of the display screen of the terminal device and/or the current power consumption of the terminal device to determine the target charging strategy that more closely matches the current use scenario, so the charging effect is better and the user experience for using the terminal device is improved.

In some examples, the determining the target charging strategy according to the on-off state of the display screen and/or the current power consumption in the case where the battery electric quantity is in the second electric quantity interval or the third electric quantity interval, includes:

a second charging strategy is determined as the target charging strategy in a case where the battery electric quantity is in the second electric quantity interval and the display screen is in an off state.

In a process of charging the terminal device according to the second charging strategy, the charging temperature is negatively correlated with the charging power.

In the process of charging the terminal device according to the second charging strategy, the charging temperature is negatively correlated with the charging power, that is, the higher the charging temperature, the lower the charging power and the lower the charging speed. When the display screen is in the off state, it means that the display screen of the terminal device is in a dormant or closed state.

In the examples of the disclosure, when the battery electric quantity of the terminal device is in the second electric quantity interval and the display screen of the terminal device is in the off state, it means that the current remaining electric quantity of the terminal device is relatively sufficient. At this time, the second charging strategy is determined as the target charging strategy. Since in the process of charging the terminal device according to the second charging strategy (equalization mode), the charging temperature is negatively correlated with the charging power, at this time, the charging power may be limited by the charging temperature, the charging speed is gradually decreased according to the temperature rise, and balance between the charging temperature and the charging speed can be achieved, so that on the basis that the charging temperature of the terminal device is not too high, the charging speed is also better.

In some examples, the determining the target charging strategy according to the on-off state of the display screen and/or the current power consumption in the case where the battery electric quantity is in the second electric quantity interval or the third electric quantity interval, includes:

the second charging strategy is determined as the target charging strategy in a case where the battery electric quantity is in the second electric quantity interval, the display screen is in an on state, and the current power consumption is less than a preset power consumption threshold value; and a third charging strategy is determined as the target charging strategy in a case where the battery electric quantity is in the second electric quantity interval, the display screen is in the on state, and the current power consumption is greater than or equal to the preset power consumption threshold value.

In a process of charging the terminal device according to the third charging strategy, the charging temperature is less than a preset temperature threshold value.

In the process of charging the terminal device according to the second charging strategy, the charging temperature is negatively correlated with the charging power. In other words, the higher the charging temperature, the lower the charging power and the lower the charging speed. In the case where the display screen is in the on state and the current power consumption is less than the preset power consumption threshold value, it means that the terminal device is in a bright screen and low power consumption state. At this time, a load of the terminal device is low, that is, an output current of a battery of the terminal device is less than a set current threshold value (for example, 1 ampere (A)), for example, a user browses a news interface through the display screen in the on state.

In the case where the display screen is in the on state and the current power consumption is greater than or equal to the preset power consumption threshold value, it means that the terminal device is in a bright screen and high power consumption state. At this time, the load of the terminal device is high, that is, the output current of the battery of the terminal device is greater than the set current threshold value (for example, 1 ampere (A)), for example, the user plays a large mobile game through the display screen in the on state.

In the examples of the disclosure, in the case (bright screen and low power consumption scenario) where the battery electric quantity of the terminal device is in the second electric quantity interval, the display screen is in the on state and the current power consumption is less than the preset power consumption threshold value, it means that the current remaining electric quantity of the terminal device is relatively sufficient. At this time, the second charging strategy (equalization mode) may be determined as the target charging strategy, since in the process of charging the terminal device according to the second charging strategy, the charging temperature is negatively correlated with the charging power, at this time, the charging power may be limited by the charging temperature, the charging speed may be gradually decreased according to the temperature rise, and balance between the charging temperature and the charging speed can be achieved, so that on the basis that the charging temperature of the terminal device is not too high, the charging speed is also better.

In the case (bright screen and high power consumption scenario) where the battery electric quantity of the terminal device is in the second electric quantity interval, the display screen is in the on state and the current power consumption is greater than or equal to the preset power consumption threshold value, it means that the current remaining electric quantity of the terminal device is relatively sufficient, but the power consumption is high, and the heat production is also high. At this time, the third charging strategy (relaxation mode) may be determined as the target charging strategy, since in the process of charging the terminal device according to the third charging strategy, the charging temperature is less than the preset temperature threshold value, at this time, by strictly limiting the charging temperature, the charging power should be quickly slowed down to ensure that the temperature does not rise, and the possibility that a too high temperature affects a battery life is reduced.

In some examples, the determining the target charging strategy according to the on-off state of the display screen and/or the current power consumption in the case where the battery electric quantity is in the second electric quantity interval or the third electric quantity interval, includes:

the second charging strategy is determined as the target charging strategy in a case where the battery electric quantity is in the third electric quantity interval, and the display screen is in the on state.

In the process of charging the terminal device according to the second charging strategy, the charging temperature is negatively correlated with the charging power, that is, the higher the charging temperature, the lower the charging power and the lower the charging speed.

In the examples of the disclosure, in the case where the battery electric quantity of the terminal device is in the third electric quantity interval, and the display screen is in the on state (including the bright screen and high power consumption state and the bright screen and low power consumption state), it means that the current remaining electric quantity of the terminal device is sufficient, but the terminal device is still in use. At this time, the second charging strategy may be determined as the target charging strategy, since in the process of charging the terminal device according to the second charging strategy (equalization mode), the charging temperature is negatively correlated with the charging power, at this time, the charging power may be limited by the charging temperature, the charging speed may be gradually decreased according to the temperature rise, and balance between the charging temperature and the charging speed can be achieved, so that on the basis that the charging temperature of the terminal device is not too high, the charging speed is also better.

In some examples, the determining the target charging strategy according to the on-off state of the display screen and/or the current power consumption in the case where the battery electric quantity is in the second electric quantity interval or the third electric quantity interval, includes:

the third charging strategy is determined as the target charging strategy in a case where the battery electric quantity is in the third electric quantity interval, and the display screen is in the off state.

In the examples of the disclosure, in the case where the battery electric quantity of the terminal device is in the third electric quantity interval and the display screen is in the off state, it means that the current remaining electric quantity of the terminal device is sufficient, but the terminal device may not be with the user. At this time, the charging temperature may be controlled first, the third charging strategy (relaxation mode) may be determined as the target charging strategy, since in the process of charging the terminal device according to the third charging strategy, the charging temperature is less than the preset temperature threshold value, at this time, by strictly limiting the charging temperature, the charging power should be quickly slowed down to ensure that the temperature does not rise, and the safety problems caused by a too high temperature are reduced.

In other examples, the terminal device may also detect the on-off state of the display screen and the power consumption according to a preset period. By setting the preset period, the on-off state of the display screen and the power consumption of the terminal device at different time points may be obtained in real time, so that the charging control process is more accurate.

Figure 3:
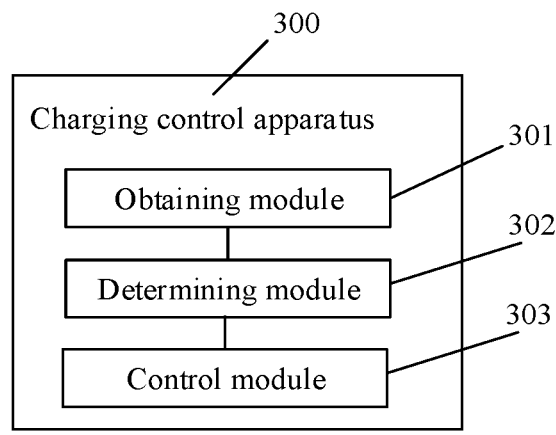
FIG. 3 is a schematic structural diagram showing a charging control apparatus according to an example.

The disclosure further provides a charging control apparatus. FIG. 3 is a schematic structural diagram showing a charging control apparatus according to an example. As shown in FIG. 3, the charging control apparatus 300 is applied to a terminal device, and includes:

an obtaining module 301, configured to obtain a battery electric quantity of the terminal device and current state information of the terminal device;

a determining module 302, configured to determine a target charging strategy according to the battery electric quantity and/or the current state information; and a control module 303, configured to control the terminal device to be charged according to the target charging strategy.

In some examples, the current state information includes: an on-off state of a display screen of the terminal device and current power consumption of the terminal device;

the determining module 302 is configured to:

determine the target charging strategy according to at least one of an electric quantity interval in which the battery electric quantity is located, the on-off state of the display screen, or the current power consumption.

The electric quantity interval at least includes: a first electric quantity interval, a second electric quantity interval, and a third electric quantity interval, an electric quantity value covered by the first electric quantity interval is less than an electric quantity value covered by the second electric quantity interval, and the electric quantity value covered by the second electric quantity interval is less than an electric quantity value covered by the third electric quantity interval.

In some examples, the determining module 302 is configured to:

determine a first charging strategy as the target charging strategy in a case where the battery electric quantity is in the first electric quantity interval.

Charging power of the terminal device to be charged according to the first charging strategy is greater than preset charging power.

In some examples, the determining module 302 is configured to:

determine the target charging strategy according to the on-off state of the display screen and/or the current power consumption in a case where the battery electric quantity is in the second electric quantity interval or the third electric quantity interval.

In some examples, the determining module 302 is configured to:

determine a second charging strategy as the target charging strategy in a case where the battery electric quantity is in the second electric quantity interval and the display screen is in an off state.

In a process of charging the terminal device according to the second charging strategy, a charging temperature is negatively correlated with the charging power.

In some examples, the determining module 302 is configured to:

determine the second charging strategy as the target charging strategy in a case where the battery electric quantity is in the second electric quantity interval, the display screen is in an on state, and the current power consumption is less than a preset power consumption threshold value; and determine a third charging strategy as the target charging strategy in a case where the battery electric quantity is in the second electric quantity interval, the display screen is in the on state, and the current power consumption is greater than or equal to the preset power consumption threshold value.

In a process of charging the terminal device according to the third charging strategy, a charging temperature is less than a preset temperature threshold value.

In some examples, the determining module 302 is configured to:

determine the second charging strategy as the target charging strategy in a case where the battery electric quantity is in the third electric quantity interval, and the display screen is in the on state.

In some examples, the determining module 302 is configured to:

determine the third charging strategy as the target charging strategy in a case where the battery electric quantity is in the third electric quantity interval, and the display screen is in the off state.

In some examples, the apparatus 300 further includes:

an adjusting module, configured to adjust a boundary value of each electric quantity interval according to historical charging data.

The boundary value of each electric quantity interval includes: an upper limit value and a lower limit value of the electric quantity interval.

In some examples, the historical charging data includes: a historical initial charging electric quantity and a historical ending charging electric quantity of the terminal device; and the adjusting module is configured to:

in response to the historical initial charging electric quantity within a first set duration is greater than an upper limit value of the first electric quantity interval, increase the upper limit value of the first electric quantity interval; and in response to the historical ending charging electric quantity within a second set duration is greater than a lower limit value of the third electric quantity interval, increase the lower limit value of the third electric quantity interval.

Regarding the apparatus in the above examples, the specific manner in which each module performs operation has been described in detail in the examples of the method, and detailed description will not be given here.

Figure 4:
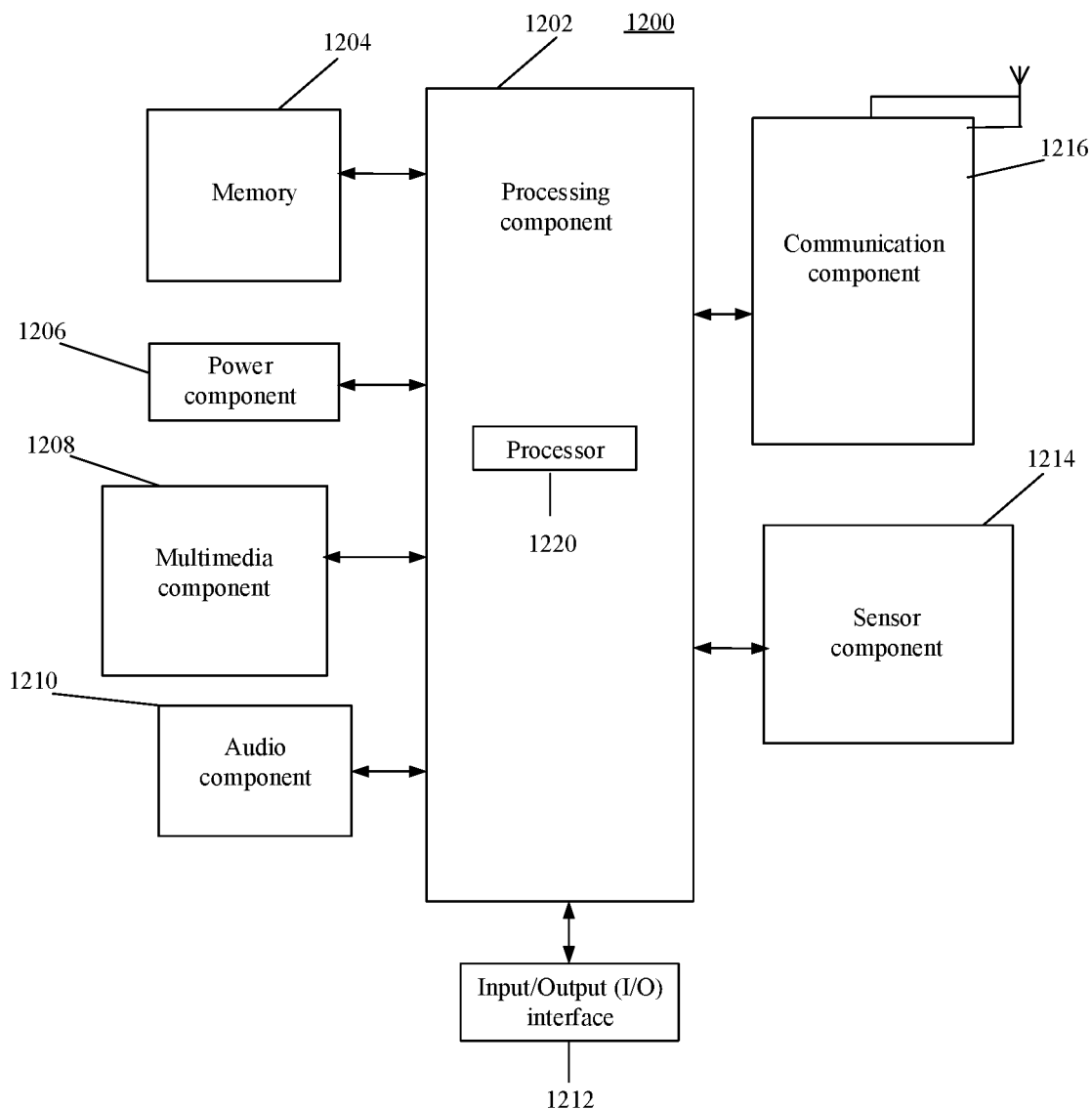
FIG. 4 is a block diagram showing an electronic device according to an example.

FIG. 4 is a block diagram showing an electronic device 1200 according to an example. For example, the device 1200 may be a mobile phone, a computer, a digital broadcasting terminal, a message transceiver device, a game console, a tablet device, a medical device, a fitness device, a personal digital assistant, and the like.

Referring to FIG. 4, the device 1200 may include one or more of the following components: a processing component 1202, a memory 1204, a power component 1206, a multimedia component 1208, an audio component 1210, an Input/Output (I/O) interface 1212, a sensor component 1214, and a communication component 1216.

The processing component 1202 generally controls overall operations of the device 1200, such as operations associated with displaying, telephone calls, data communications, camera operations, and recording operations. The processing component 1202 may include one or more processors 1220 to execute instructions to complete all or part of the steps of the method described above. In addition, the processing component 1202 may include one or more modules to facilitate interaction between the processing component 1202 and other components. For example, the processing component 1202 may include a multimedia module to facilitate the interaction between the multimedia component 1208 and the processing component 1202.

The memory 1204 is configured to store various types of data to support operations on the device 1200. Instances of such data include instructions for any applications or methods operated on the device 1200, contact data, phonebook data, messages, pictures, videos, etc. The memory 1204 may be implemented by any type of volatile or non-volatile memory devices, or combinations thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or compact disk.

The power component 1206 provides power to the various components of the device 1200. The power component 1206 may include a power management system, one or more power sources, and any other components associated with the generation, management and distribution of power in the device 1200.

The multimedia component 1208 includes a screen that provides an output interface between the device 1200 and a user. In some examples, the screen may include a liquid crystal display (LCD) and a touch panel (TP). If it includes the touch panel, the screen may be implemented as a touch screen to receive an input signal from the user. The touch panel includes one or more touch sensors to sense touch, sliding, and gestures on the touch panel. The touch sensors may not only sense a boundary of a touch or sliding action, but also detect duration and pressure related to the touch or sliding operation. In some examples, the multimedia component 1208 includes a front camera and/or a rear camera. The front camera and/or the rear camera may receive external multimedia data while the device 1200 is in an operation mode, such as a photographing mode or a video mode. Each front camera and each rear camera may be fixed optical lens systems or may have focal lengths and optical zoom capabilities.

The audio component 1210 is configured to output and/or input audio signals. For example, the audio component 1210 includes a microphone (MIC), and the microphone is configured to receive an external audio signal when the device 1200 is in an operation mode, such as a calling mode, a recording mode, and a voice identification mode. The received audio signal may be further stored in the memory 1204 or transmitted via the communication component 1216. In some examples, the audio component 1210 further includes a speaker configured to output audio signals.

The I/O interface 1212 provides an interface between the processing component 1202 and peripheral interface modules, which may be keyboards, click wheels, buttons, etc. These buttons may include, but not limited to: a home button, a volume button, a start button, and a lock button.

The sensor component 1214 includes one or more sensors configured to provide various aspects of state assessment for the device 1200. For example, the sensor component 1214 may detect an on/off state of the device 1200, and relative positioning of components such as a display and a keypad of the device 1200. The sensor component 1214 may also detect a change in position of the device 1200 or a component of the device 1200, presence or absence of contact between the user and the device 1200, an orientation or acceleration/deceleration of the device 1200, and a change in temperature of the device 1200. The sensor component 1214 may include a proximity sensor configured to detect the existence of objects nearby without any physical contact. The sensor component 1214 may also include light sensors, such as CMOS or CCD image sensors, for use in imaging applications. In some examples, the sensor component 1214 may also include an acceleration sensor, a gyroscope sensor, a magnetic sensor, a pressure sensor, or a temperature sensor.

The communication component 1216 is configured to facilitate a wired or wireless communication between the device 1200 and other devices. The device 1200 may access a wireless network based on a communication standard, such as WiFi, 4G or 5G, or combinations thereof. In one example, the communication component 1216 receives broadcast signals or broadcast related information from an external broadcast management system via a broadcast channel. In one example, the communication component 1216 further includes a Near Field Communication (NFC) module to facilitate short-range communications. For example, the NFC module may be implemented based on a Radio Frequency Identification (RFID) technology, an Infrared Data Association (IrDA) technology, an Ultra-Wide Band (UWB) technology, a Bluetooth (BT) technology and other technologies.

In examples, the device 1200 may be implemented by one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components to perform the above method.

In examples, a non-transitory computer-readable storage medium including instructions is also provided, for example, the memory 1204 including instructions, which may be executed by the processor 1220 of the device 1200 to perform the above method. For example, the non-transitory computer-readable storage medium may be a ROM, a Random Access Memory (RAM), a CD-ROM, a magnetic tape, a floppy disk, an optical data storage device, and the like.

According to the non-transitory computer-readable storage medium, when the instructions in the storage medium are executed by the processor of the electronic device, the electronic device may execute a charging control method, and the method includes:

obtaining a battery electric quantity of a terminal device and current state information of the terminal device;

determining a target charging strategy according to the battery electric quantity and/or the current state information; and controlling the terminal device to be charged according to the target charging strategy.

Other implementation solutions of the disclosure will be apparent to those skilled in the art from consideration of the specification and practice of the disclosure herein. The disclosure is intended to cover any variations, uses, or adaptations of the disclosure following the general principles thereof and including such departures from the disclosure as come within known or customary practice in the art. It is intended that the specification and examples are considered as exemplary only, with a true scope and spirit of the disclosure being indicated by the following claims.

It will be appreciated that the disclosure is not limited to the exact construction that has been described above and illustrated in the accompanying drawings, and that various modifications and changes may be made without departing from the scope thereof. It is intended that the scope of the disclosure is only limited by the appended claims.

The invention claimed is:

1. A charging control method, applied to a terminal device, and comprising:

obtaining a battery electric quantity of the terminal device and current state information of the terminal device;

determining a target charging strategy according to the battery electric quantity and/or the current state information; and controlling the terminal device to be charged according to the target charging strategy;

wherein the current state information comprises: an on-off state of a display screen of the terminal device and current power consumption of the terminal device; and wherein the determining the target charging strategy according to the battery electric quantity and/or the current state information, comprises:

determining the target charging strategy according to at least one of an electric quantity interval in which the battery electric quantity is located, the on-off state of the display screen, or the current power consumption;

wherein the electric quantity interval at least comprises: a first electric quantity interval, a second electric quantity interval, and a third electric quantity interval, an electric quantity value covered by the first electric quantity interval is less than an electric quantity value covered by the second electric quantity interval, and the electric quantity value covered by the second electric quantity interval is less than an electric quantity value covered by the third electric quantity interval.

2. The charging control method according to claim 1, wherein determining the target charging strategy according to at least one of the electric quantity interval in which the battery electric quantity is located, the on-off state of the display screen, or the current power consumption, comprises:

determining a first charging strategy as the target charging strategy in a case where the battery electric quantity is in the first electric quantity interval;

wherein charging power of the terminal device to be charged according to the first charging strategy is greater than preset charging power.

3. The charging control method according to claim 1, wherein determining the target charging strategy according to at least one of the electric quantity interval in which the battery electric quantity is located, the on-off state of the display screen, or the current power consumption, comprises:

determining the target charging strategy according to the on-off state of the display screen and/or the current power consumption in a case where the battery electric quantity is in the second electric quantity interval or the third electric quantity interval.

4. The charging control method according to claim 3, wherein determining the target charging strategy according to the on-off state of the display screen and/or the current power consumption in the case where the battery electric quantity is in the second electric quantity interval or the third electric quantity interval, comprises:

determining a second charging strategy as the target charging strategy in response to the battery electric quantity is in the second electric quantity interval and the display screen is in an off state;

wherein in a process of charging the terminal device according to the second charging strategy, a charging temperature is negatively correlated with charging power.

5. The charging control method according to claim 3, wherein the determining the target charging strategy according to the on-off state of the display screen and/or the current power consumption in the case where the battery electric quantity is in the second electric quantity interval or the third electric quantity interval, comprises:

determining a second charging strategy as the target charging strategy in response to the battery electric quantity is in the second electric quantity interval, the display screen is in an on state, and the current power consumption is less than a preset power consumption threshold value; and determining a third charging strategy as the target charging strategy in response to the battery electric quantity is in the second electric quantity interval, the display screen is in the on state, and the current power consumption is greater than or equal to the preset power consumption threshold value;

wherein in a process of charging the terminal device according to the third charging strategy, a charging temperature is less than a preset temperature threshold value.

6. The charging control method according to claim 3, wherein the determining the target charging strategy according to the on-off state of the display screen and/or the current power consumption in the case where the battery electric quantity is in the second electric quantity interval or the third electric quantity interval, comprises:

determining a second charging strategy as the target charging strategy in response to the battery electric quantity is in the third electric quantity interval, and the display screen is in an on state.

7. The charging control method according to claim 3, wherein the determining the target charging strategy according to the on-off state of the display screen and/or the current power consumption in the case where the battery electric quantity is in the second electric quantity interval or the third electric quantity interval, comprises:

determining a third charging strategy as the target charging strategy in response to the battery electric quantity is in the third electric quantity interval, and the display screen is in an off state.

8. The charging control method according to claim 3, wherein the charging control method further comprises:

adjusting a boundary value of each electric quantity interval according to historical charging data;

wherein the boundary value of each electric quantity interval comprises: an upper limit value and a lower limit value of the electric quantity interval.

9. The charging control method according to claim 8, wherein the historical charging data comprises: a historical initial charging electric quantity and a historical ending charging electric quantity of the terminal device; and the adjusting the boundary value of each electric quantity interval according to the historical charging data, comprises:

in response to the historical initial charging electric quantity within a first set duration is greater than an upper limit value of the first electric quantity interval, increasing the upper limit value of the first electric quantity interval; and in response to the historical ending charging electric quantity within a second set duration is greater than a lower limit value of the third electric quantity interval, increasing the lower limit value of the third electric quantity interval.

10. An electronic device, comprising:

a processor and a memory configured to store executable instructions that can run on the processor, wherein the processor is configured to:
obtain a battery electric quantity of a terminal device and current state information of the terminal device;
determine a target charging strategy according to the battery electric quantity and/or the current state information; and
control the terminal device to be charged according to the target charging strategy;
wherein the current state information comprises: an on-off state of a display screen of the terminal device and current power consumption of the terminal device; and the processor is further configured to:
determine the target charging strategy according to at least one of an electric quantity interval in which the battery electric quantity is located, the on-off state of the display screen, or the current power consumption;
wherein the electric quantity interval at least comprises: a first electric quantity interval, a second electric quantity interval, and a third electric quantity interval, an electric quantity value covered by the first electric quantity interval is less than an electric quantity value covered by the second electric quantity interval, and the electric quantity value covered by the second electric quantity interval is less than an electric quantity value covered by the third electric quantity interval.

11. The electronic device according to claim 10, wherein the processor is further configured to:

determine a first charging strategy as the target charging strategy in a case where the battery electric quantity is in the first electric quantity interval;

wherein charging power of the terminal device to be charged according to the first charging strategy is greater than preset charging power.

12. The electronic device according to claim 10, wherein the processor is further configured to:

determine the target charging strategy according to the on-off state of the display screen and/or the current power consumption in a case where the battery electric quantity is in the second electric quantity interval or the third electric quantity interval.

13. The electronic device according to claim 12, wherein the processor is further configured to:
   determine a second charging strategy as the target charging strategy in response to the battery electric quantity is in the second electric quantity interval and the display screen is in an off state;
   wherein in a process of charging the terminal device according to the second charging strategy, a charging temperature is negatively correlated with charging power.

14. The electronic device according to claim 12, wherein the processor is further configured to:
   determine a second charging strategy as the target charging strategy in response to the battery electric quantity is in the second electric quantity interval, the display screen is in an on state, and the current power consumption is less than a preset power consumption threshold value; and
   determine a third charging strategy as the target charging strategy in response to the battery electric quantity is in the second electric quantity interval, the display screen is in the on state, and the current power consumption is greater than or equal to the preset power consumption threshold value;
   wherein in a process of charging the terminal device according to the third charging strategy, a charging temperature is less than a preset temperature threshold value.

15. The electronic device according to claim 12, wherein the processor is further configured to:
   determine a second charging strategy as the target charging strategy in response to the battery electric quantity is in the third electric quantity interval, and the display screen is in an on state.

16. The electronic device according to claim 12, wherein the processor is further configured to:
   determine a third charging strategy as the target charging strategy in response to the battery electric quantity is in the third electric quantity interval, and the display screen is in an off state.

17. The electronic device according to claim 10, wherein the processor is further configured to:
   adjust a boundary value of each electric quantity interval according to historical charging data;
   wherein the boundary value of each electric quantity interval comprises: an upper limit value and a lower limit value of the electric quantity interval.

18. A non-transitory computer-readable storage medium storing computer-executable instructions that, when executed by a processor, cause the processor to perform a charging control method, wherein the charging control method comprises:
   obtaining a battery electric quantity of a terminal device and current state information of the terminal device;
   determining a target charging strategy according to the battery electric quantity and/or the current state information; and
   controlling the terminal device to be charged according to the target charging strategy;
   wherein the current state information comprises: an on-off state of a display screen of the terminal device and current power consumption of the terminal device; and
   wherein the determining the target charging strategy according to the battery electric quantity and/or the current state information, comprises:
      determining the target charging strategy according to at least one of an electric quantity interval in which the battery electric quantity is located, the on-off state of the display screen, or the current power consumption;
      wherein the electric quantity interval at least comprises: a first electric quantity interval, a second electric quantity interval, and a third electric quantity interval, an electric quantity value covered by the first electric quantity interval is less than an electric quantity value covered by the second electric quantity interval, and the electric quantity value covered by the second electric quantity interval is less than an electric quantity value covered by the third electric quantity interval.

* * * * *